No. 640,082. Patented Dec. 26, 1899.
D. E. BENNETT.
VEHICLE TIRE.
(Application filed May 25, 1899.)
(No Model.)
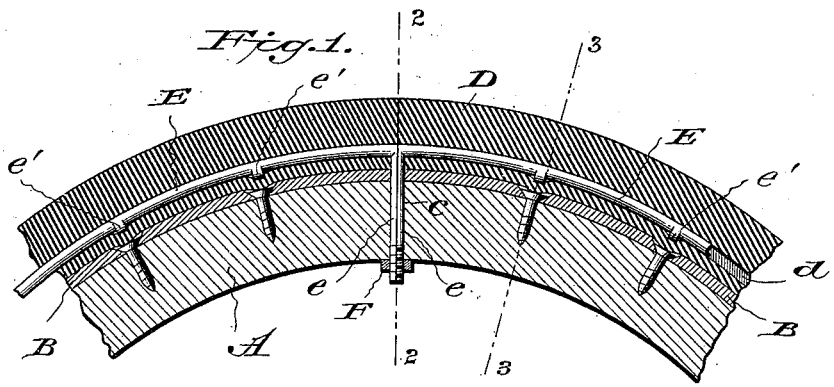
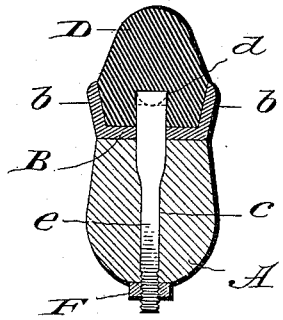
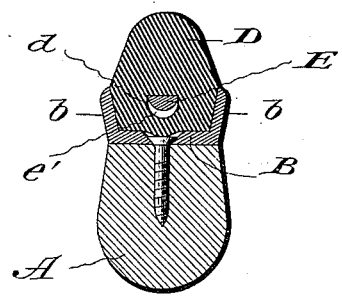
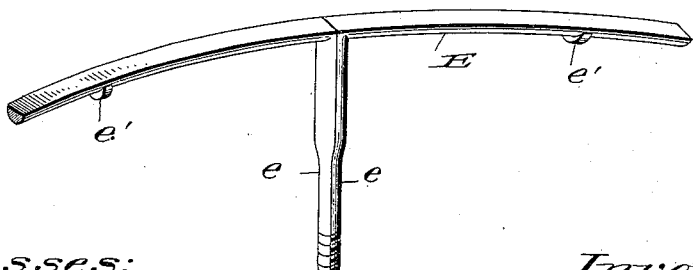
Witnesses:
G. S. Elliott.
A. W. T. Beall.
Inventor:
D. Edwin Bennett,
by
John B. Thomas & Co.,
attorneys.

UNITED STATES PATENT OFFICE.

DANIEL EDWIN BENNETT, OF MELROSE, MASSACHUSETTS.

VEHICLE-TIRE.

SPECIFICATION forming part of Letters Patent No. 640,082, dated December 26, 1899.

Application filed May 25, 1899. Serial No. 718,249. (No model.)

*To all whom it may concern:*

Be it known that I, DANIEL EDWIN BENNETT, a citizen of the United States, and a resident of Melrose, in the county of Middlesex and State of Massachusetts, have invented certain new and useful Improvements in Tires for Vehicles, of which the following is a specification.

My invention is an improvement in rubber tires for vehicles, and relates more especially to that class generally known as "cushion-tires," the object of my said invention being to provide for removably fastening the rubber tire to the rim in such manner that when in place the said tire will be securely held and prevented from slipping or bunching on the rim.

With the above objects in view my invention contemplates the production of a simple and effective fastening device for a cushion-tire comprising a half-round metal band or tape which is passed through an opening extending longitudinally through the rubber tire and the ends bent abruptly at right angles to engage a round opening in the rim and felly, while the terminals are threaded to receive a retaining-nut, the said metal band or tape having cross-bars or lateral projections which serve to more firmly clamp the rubber tire upon the rim at intervals, and thereby prevent the tire from slipping or bunching.

The following specification enters into a detail description of my invention, reference being had to the accompanying drawings, and to letters thereon, which designate the different parts, and what I claim as new in the particular construction and combination of parts is more specifically set forth in the appended claims.

In the drawings forming a part hereof, Figure 1 is a longitudinal sectional view through a vehicle-wheel provided with my improved tire. Fig. 2 is a transverse sectional view on the line 2 2 of Fig. 1. Fig. 3 is a similar view on the line 3 3 of Fig. 1. Fig. 4 is a detail view of a portion of the metal band or tape.

Referring to said drawings, A designates the felly of the wheel, which may be constructed of wood, and upon this felly is secured a metal rim B, provided with flaring side flanges $b$ $b$, said rim being secured to the felly by wood-screws or in any other suitable manner. At one point the felly and rim are provided with a round hole $c$, extending through the same, said hole being for the purpose hereinafter specified. The metal rim forms a channel around the periphery of the wheel to receive the rubber tire, (designated in the drawings by the letter D,) and the lower portion of said tire is shaped to correspond with the shape of the channel to fit snugly therein, while the upper portion of said tire is rounded, as shown, to provide the ordinary tread-surface.

In carrying out my invention the rubber tire D is provided at its lower portion with an opening $d$, extending longitudinally therethrough and leaving a thin wall at the base of the tire. Through this opening is threaded a metal band or tape E, which is half-round in cross-section and has its flat side uppermost, and after applying this band the ends thereof, which, projecting beyond the ends of the tire, are bent abruptly at substantially right angles to form the members or arms $e$ $e$, by which the parts are fastened to the wheel, it being noted that the thin wall at the base of the tire is cut away at its ends to receive the members or arms $e$ $e$ and permit the ends of the rubber tire to come closely together and form a neat joint. The ends of the arms or members $e$ $e$ of the retaining-band are threaded to receive a nut F.

It will be understood that the rubber tire is of a single length, and after being provided with my improved fastening band or tape it is put around the wheel in the channel of the rim, and the bent ends of said band are then brought together and passed through the hole in the rim and felly, after which the nut is screwed upon the threaded ends and brought to bear against the under side of the felly, clamping the band and tire securely upon the wheel. The length of the band is such that the placing of the tire upon the wheel will require the bent ends of said band to be driven through the opening with force to thereby draw or clamp said band tightly around the wheel and securely hold the tire in the rim.

In order to prevent the rubber tire from slipping or bunching, the metal band is provided at intervals throughout its length with short cross-bars or lateral projections $e'$, which bulge the lower part of the tire outward and increase the friction upon the rim, forming projections at the sides and base of the tire, which bear forcibly against the base and flanges of the rim. By providing these cross-bars or projections and forming a sharp contact with the rim at intervals around the wheel it will effectually prevent the tire from slipping on the rim and band or bunching.

By providing a half-round band the bent ends when brought together form practically a single round arm or member which will pass through a round hole of the same size, and therefore the hole in the rim and felly may be made with an ordinary brace and bit. It is also apparent that by securing the band in place by a nut will insure a closer fit of the ends of the band against the rim and also provide for readily and conveniently removing the tire for repair or renewal, besides possessing the advantage of making an effective connection.

Having thus described my invention, what I claim as new, and desire to secure by Letters Patent, is—

1. In a vehicle-wheel, the combination with the felly and rim having a hole through the same, the rim forming a channel for the tire, of a rubber tire having an opening extending longitudinally therethrough, a metal band passed through the opening in the tire, and means securing the ends of the band to the wheel; together with cross-bars or projections at intervals along the band, substantially as shown and for the purpose set forth.

2. In a vehicle-wheel, the combination with the felly and rim having a round hole through the same, the rim forming a channel for the tire, of the rubber tire having an opening extending longitudinally therethrough, a metal band half-round in cross-section passed through the opening in the tire with its flat side uppermost, the ends of said band being bent abruptly at substantially right angles their flat sides brought together and said ends passed through the hole in the felly and rim and their combined ends threaded; cross-bars or projections on the band at intervals along the same, and a nut screwed upon the ends of the band to bear against the inner side of the felly, substantially as shown and for the purpose set forth.

In testimony whereof I hereunto affix my signature in the presence of two witnesses.

D. EDWIN BENNETT.

Witnesses:
WILLIAM A. BURRELL,
FRANK O. SILVER.